(12) United States Patent
Mohamed et al.

(10) Patent No.: US 11,070,553 B2
(45) Date of Patent: Jul. 20, 2021

(54) APPARATUS AND METHOD FOR CONTEXT-BASED STORAGE AND RETRIEVAL OF MULTIMEDIA CONTENT

(71) Applicant: SAP SE, Walldorf (DE)

(72) Inventors: Abdul Hakeem Mohamed, Palo Alto, CA (US); Shriniket Kale, Palo Alto, CA (US); Alexander Schaefer, Palo Alto, CA (US); Sanjay Rajagopalan, Palo Alto, CA (US)

(73) Assignee: SAP SE, Walldorf (DE)

( * ) Notice: Subject to any disclaimer, the term of this patent is extended or adjusted under 35 U.S.C. 154(b) by 60 days.

(21) Appl. No.: 16/686,684

(22) Filed: Nov. 18, 2019

(65) Prior Publication Data

US 2020/0196020 A1 Jun. 18, 2020

Related U.S. Application Data

(63) Continuation of application No. 14/546,521, filed on Nov. 18, 2014, now abandoned.

(60) Provisional application No. 61/906,327, filed on Nov. 19, 2013.

(51) Int. Cl.
| | |
|---|---|
| *H04L 29/06* | (2006.01) |
| *G06F 16/48* | (2019.01) |
| *G06F 16/438* | (2019.01) |
| *H04L 29/08* | (2006.01) |
| *H04W 4/021* | (2018.01) |
| *H04W 12/06* | (2021.01) |
| *H04N 21/482* | (2011.01) |

(52) U.S. Cl.
CPC ........ *H04L 63/0861* (2013.01); *G06F 16/438* (2019.01); *G06F 16/48* (2019.01); *H04L 67/14* (2013.01); *H04L 67/24* (2013.01); *H04N 21/4828* (2013.01); *H04W 4/021* (2013.01); *H04W 12/06* (2013.01)

(58) Field of Classification Search
None
See application file for complete search history.

(56) References Cited

U.S. PATENT DOCUMENTS

| | | | | |
|---|---|---|---|---|
| 6,564,213 | B1 * | 5/2003 | Ortega | G06F 16/3322 |
| 8,041,730 | B1 * | 10/2011 | Upstill | G06F 16/29 |
| | | | | 707/769 |
| 10,185,748 | B1 * | 1/2019 | Ayzenshtat | G06F 16/90324 |
| 2005/0283468 | A1 * | 12/2005 | Kamvar | G06F 16/3325 |
| 2007/0185865 | A1 * | 8/2007 | Budzik | G06F 16/248 |
| 2009/0043741 | A1 * | 2/2009 | Kim | G06F 40/274 |
| 2009/0083232 | A1 * | 3/2009 | Ives | G06F 16/3322 |
| 2009/0199230 | A1 * | 8/2009 | Kumar | G06Q 30/0268 |
| | | | | 725/32 |
| 2011/0314021 | A1 * | 12/2011 | Gibbs | G06F 16/3322 |
| | | | | 707/737 |
| 2012/0047135 | A1 * | 2/2012 | Hansson | G06F 16/338 |
| | | | | 707/731 |
| 2013/0007792 | A1 * | 1/2013 | Jeon | H04N 21/4828 |
| | | | | 725/14 |
| 2013/0080423 | A1 * | 3/2013 | Parikh | G06F 16/242 |
| | | | | 707/722 |

(Continued)

*Primary Examiner* — Alexander Q Huerta
(74) *Attorney, Agent, or Firm* — Fountainhead Law Group P.C.

(57) ABSTRACT

Disclosed is a solution that tags and stores video, audio, pictures, text, and other content, along with their associated metadata to allow for contextual retrieval and customized playback of stored content.

20 Claims, 13 Drawing Sheets

(56) References Cited

U.S. PATENT DOCUMENTS

| | | | |
|---|---|---|---|
| 2014/0164348 A1* | 6/2014 | Reed | G06F 16/9577 |
| | | | 707/708 |
| 2014/0181100 A1* | 6/2014 | Ramer | G06F 3/0236 |
| | | | 707/728 |
| 2014/0207789 A1* | 7/2014 | Lee | G06F 16/90324 |
| | | | 707/741 |
| 2014/0280000 A1* | 9/2014 | Subramanian Karthik | |
| | | | G06F 16/90324 |
| | | | 707/706 |
| 2016/0321727 A1* | 11/2016 | Levin | G06F 16/9535 |

* cited by examiner

Fig. 10

APPARATUS AND METHOD FOR CONTEXT-BASED STORAGE AND RETRIEVAL OF MULTIMEDIA CONTENT

CROSS REFERENCE TO RELATED APPLICATIONS

This application is a continuation application and, pursuant to 35 U.S.C. § 120, is entitled to and claims the benefit of earlier filed application U.S. application Ser. No. 14/546,521 filed Nov. 18, 2014, which in turn is entitled to and claims the benefit of the filing date of U.S. Provisional App. No. 61/906,327 filed Nov. 19, 2013, the content of both of which are incorporated herein by reference in its entirety for all purposes.

BACKGROUND

Unless otherwise indicated, the foregoing is not admitted to be prior art to the claims recited herein and should not be construed as such.

There has been a meteoric rise in the amount of multimedia content that is being generated on a daily basis. Digitization of information and knowledge has been one of the many reasons for this change. Various tools that made it easy to generate media have largely aided this. Various forms of multimedia are now being generated and shared so that they can be viewed, consumed or worked collaboratively upon, by a large set of viewers. Also, there has been constant reduction in production costs of high volume, quick access storage devices. This has contributed to the tendency to record and store in some manner anything and everything that could potentially be useful sometime in the future.

As a result of this increasing access to multimedia, it is quite evident that we no longer have the time to consume the various forms of multimedia relevant to us. In many endeavors, there is likely to be a proliferation of detailed design documents, long videos of meetings, training courses which may need to be consumed at work, and so on. Videos, especially, are even more time consuming. In such situations, it can be extremely important to be able to prioritize which multimedia to consume. To make this decision, we usually try to skim through the document or video randomly, trying to gauge what the media is about. As such, one can easily miss the important parts and make a wrong decision, and it is time consuming as well. Even after shortlisting, consuming the entire media is not always feasible.

Moreover, finding relevant media is becoming a big challenge given the sheer volume and variety of media present. Traditional search engines usually limit you to one multimedia type at a time. However, that might not give you as good a results as compared to a search that cuts across all multimedia types. Also, a search against video and audio multimedia is based on title and other metadata associated with the media. The search results in this case might not necessarily reflect the most relevant hits based on actual content.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings:

FIGS. 9, 9A, and 10 illustrate examples of a media display and summary page in a user interface in accordance with some embodiments of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
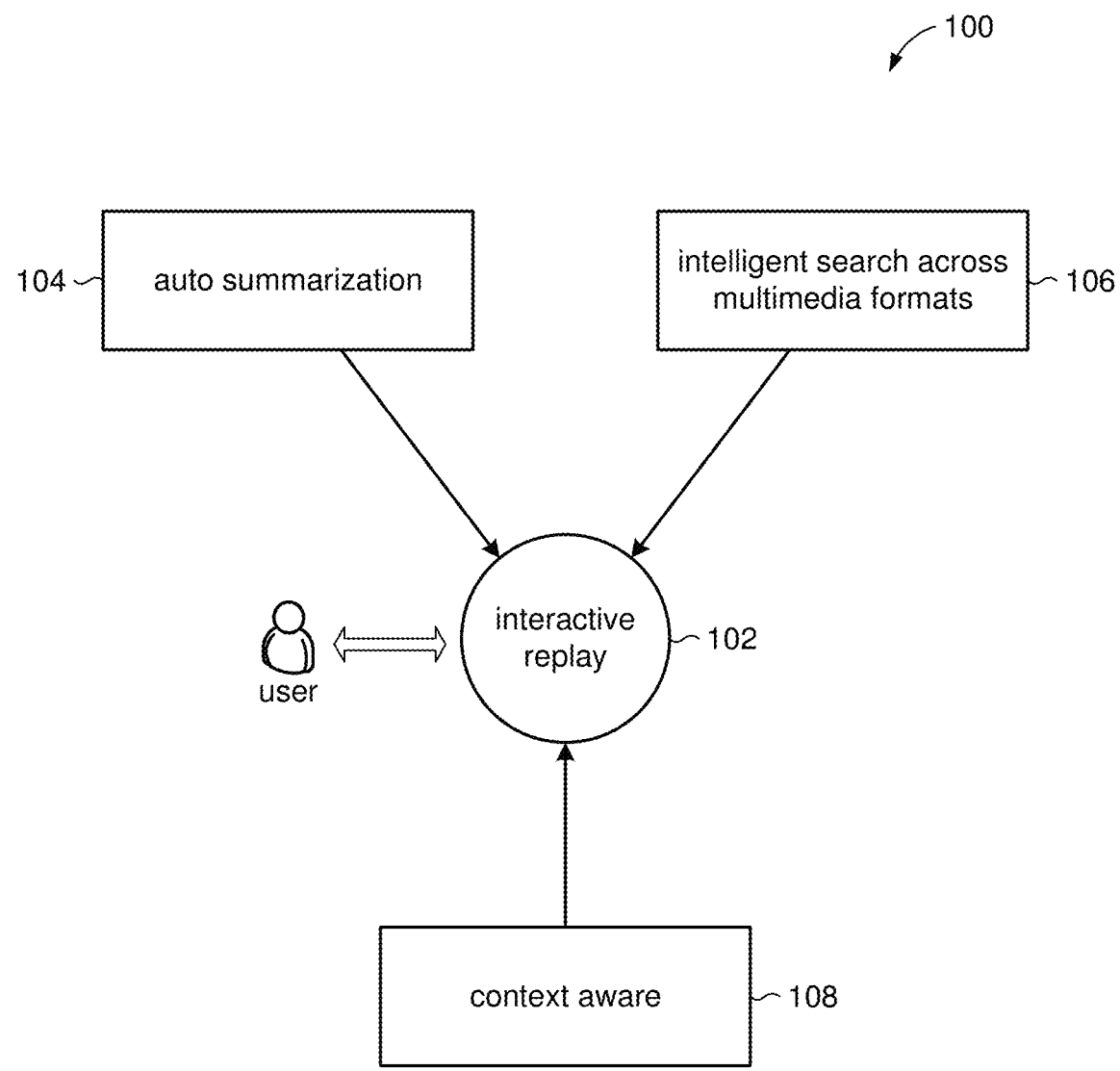
FIG. 1 is a high level overview of an interactive replay system in accordance with some embodiments of the present disclosure.

FIG. 1 illustrates a high level representation of an interactive replay system 100 in accordance with embodiments of the present disclosure. In some embodiments, the interactive replay system 100 may comprise several modules to support various capabilities for presenting multimedia content to a user. As used herein, "multimedia content" can refer generally to content in any form; e.g., a video recording, an audio recording, a document, and so on. The term "electronic document" as used herein may refer to multimedia content other than audio/visual content or audio-only content. For example, electronic documents may include word processing documents, spreadsheets, emails, PDF files, images, and so on.

The information or data that comprises the multimedia content may be referred to as "content." For example, in a video recording, the data that makes up the video and the audio data can be referred to as the "content." In an electronic document, the "content" may comprise the text, numbers, formulas (e.g., in a spreadsheet), etc. in the electronic document.

The information or data that describes or otherwise is associated with the multimedia content, but is not part of the content, is commonly referred to by persons of ordinary skill in the relevant arts as "metadata." The metadata associated with multimedia content should not be confused with the "content" that comprise the multimedia content. For example, the file size of an electronic document is an example of metadata. A storage location that describes where the multimedia content is stored is another example of metadata. Users who post comments relating to multimedia content may be considered metadata, and so on. Metadata may include any data that is associated with the multimedia content, but is not part of the content itself.

Continuing with the description of FIG. 1, in some embodiments, the interactive replay system 100 may include an auto summarization module 104 to provide summaries of multimedia content to the user. Auto summarization can give the user a quick idea of the main topics that the multimedia content contains. Auto summarization can assist the user in deciding whether it would be useful or worthwhile to make the effort to consume the multimedia content; e.g., view, listen, read, etc. Auto summarization can facilitate the user in locating portions or segments of the multimedia content that may be important or relevant to the user. This can help in the quick consumption of the multimedia content, covering important details to understand the topics contained in the multimedia content.

In some embodiments, the interactive replay system 100 may include an intelligent search module 106 to search across multimedia content of various formats. Intelligent searches may involve searching through the actual content comprising the multimedia content. In some embodiments, functionality such as auto-completion and related keyword suggestions may be supported to facilitate the search process. Intelligent searches may identify related multimedia content, which can be suggested to the user. This can allow the user to explore the topic in more detail and navigate through the multitude of stored multimedia content to access related material irrespective of the format of the content.

In some embodiments, the interactive replay system 100 may include a context awareness module 108 to provide context-based searches and deliver context-based content. For example, searches may take into account user preferences, user profile, the user's role in the organization, the user's environment (geographic location, in a meeting, etc.), the user's schedule, and so on. In some embodiments, the context of other users may be used. Delivery/presentation of content to the user may take into account such context.

An interactive replay module 102 may tie together the functionality and data provided by the auto summarization module 104, the intelligent search module 106, and the context awareness module 108. The interactive replay module 102 may serve as an interface for the user to access the system.

Figure 2:
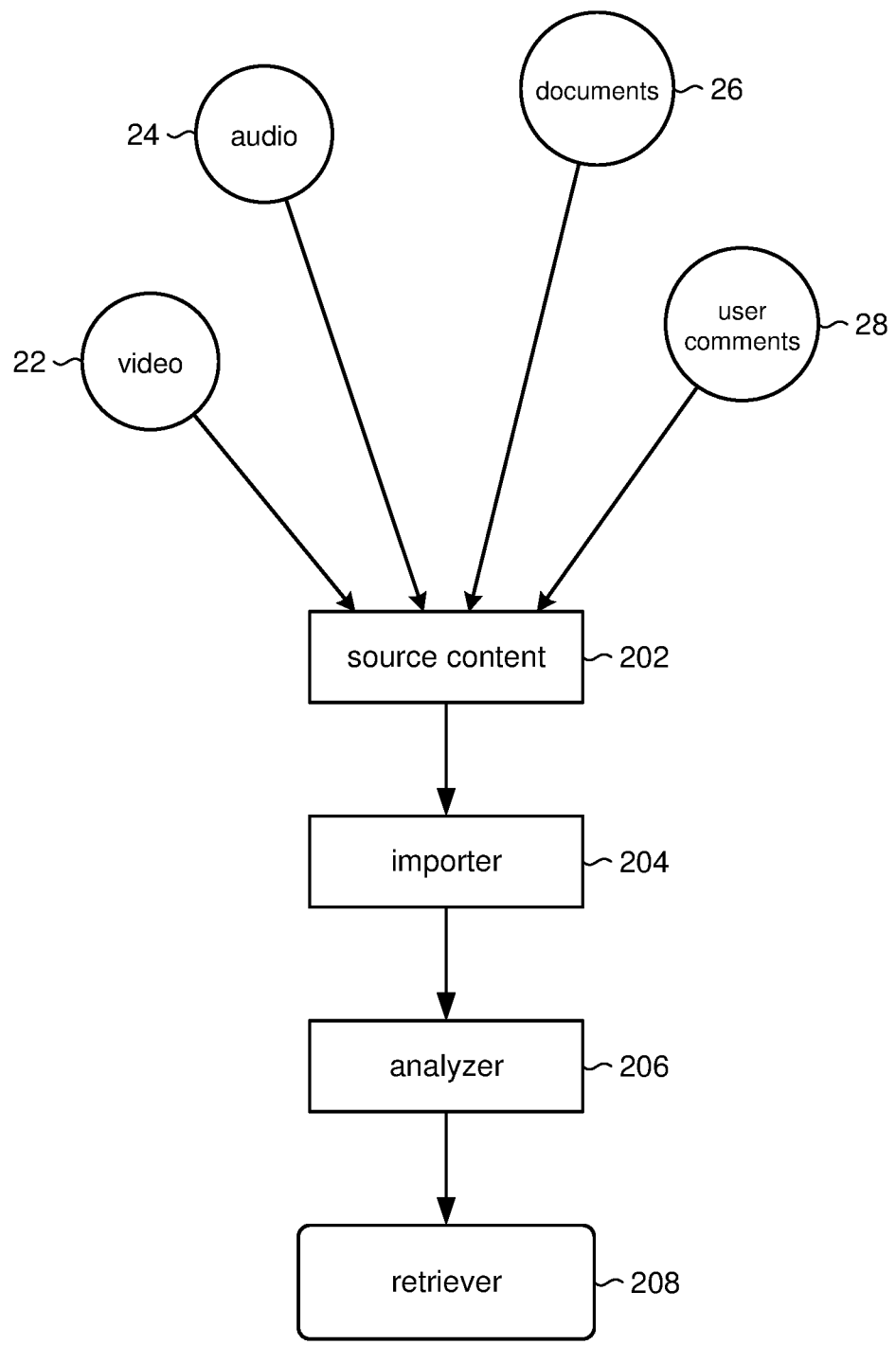
FIG. 2 highlights some of the modules of an interactive replay system in accordance with some embodiments of the present disclosure.

FIG. 2 illustrates a high level architectural depiction of an interactive replay system in accordance with some embodiments (e.g., interactive replay system 100, FIG. 1). In some embodiments, a source content module 202 may access various sources of multimedia content 22-28 to feed into the system. For example, video content 22 such as video streams, video recordings, and the like may be provided to or accessed by the source content module 202. Users may upload their previously recorded video (e.g., from a meeting) to the source content module 202. The source content module 202 may access video streams from a network. For example, a live video feed from a meeting may be streamed to the source content module 202. Likewise, audio content 24 may comprise previously recorded audio (e.g., a digital tape recording from a meeting) or live streamed audio. Electronic documents 26 may include emails, users' calendars, documents (e.g., spreadsheets, presentation slides, text documents, etc.), and so on. User comments 28 may include comments posted by users who have viewed some multimedia content online. For example, participants in a project may have online access to multimedia content relating to the project and may be able to post their comments.

In some embodiments, multimedia content may be imported by an importer module 204 in order to store it, along with any associated metadata, for further analysis. An analyzer module 206 may process the data comprising the multimedia content, including the content itself and any metadata that is associated with the multimedia content. A retriever module 208 may provide various search and playback capabilities in accordance with the present disclosure.

Figure 3:
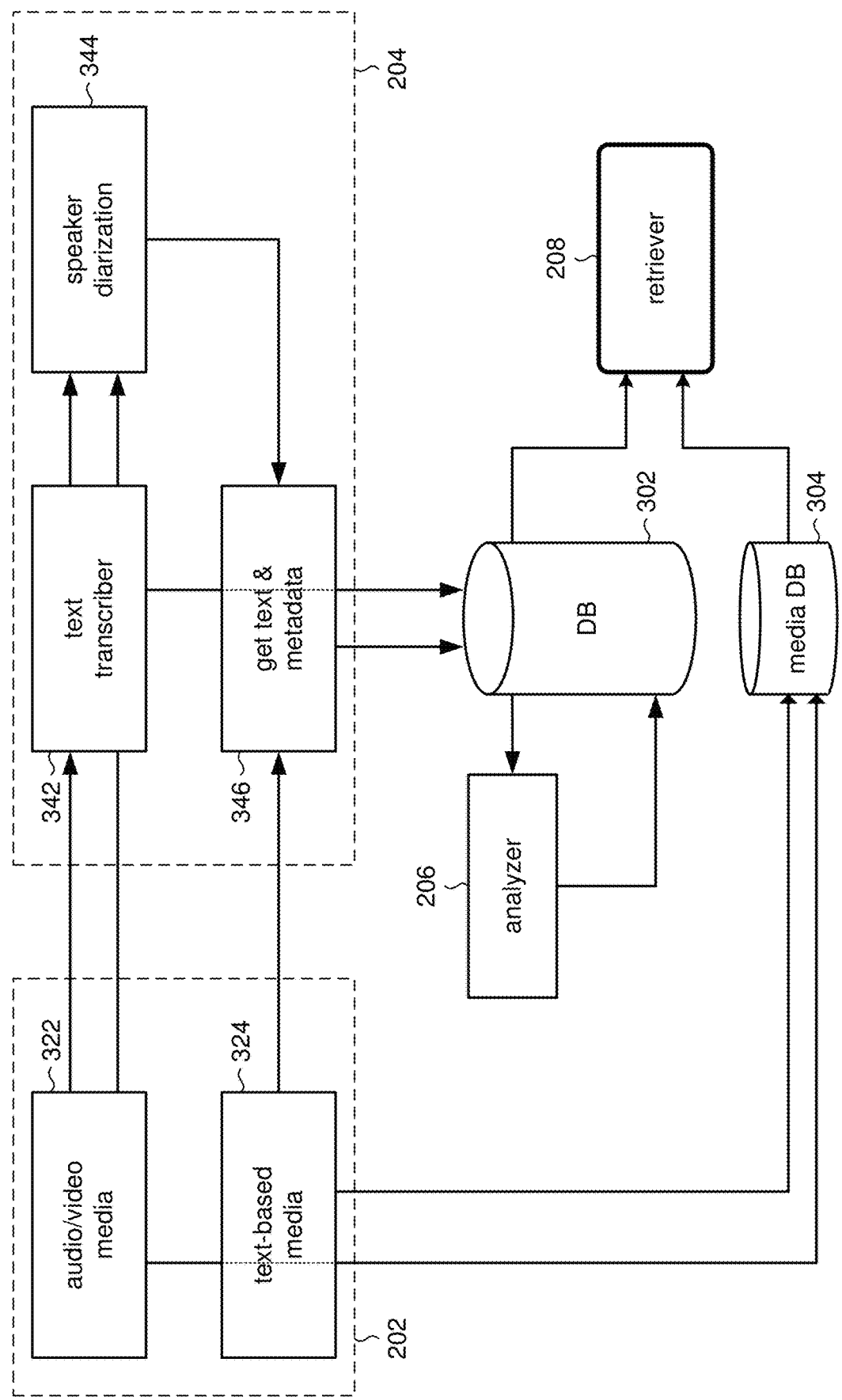
FIG. 3 illustrates additional details of the modules presented in FIG. 2.

Additional details of the architecture shown in FIG. 2 will now be described with reference to FIG. 3. The source content module 202 may serve as a source of video media and audio media 322. The video media (which typically includes an audio component) may include previously recorded video, video obtained by streaming from a network (e.g., an internal network, the Internet, etc.), live-streamed video, and so on. Similarly, audio media may include previously recorded audio, streamed audio, and so on. The source content module 202 may also serve as a source of text-based media 324, such as might be contained in electronic documents. The media 322, 324 may be stored in a media database (DB) 304 for subsequent access by the retriever 208.

In some embodiments, the importer module 204 may comprise text transcriber 342, which may perform speech to text conversion. For example, the audio portion of a video recording may be transcribed to produce transcribed text; likewise for audio media. In some embodiments, the text may be directly accessible if the multimedia content has a corresponding subtitles file. The transcribed text may be stored in a textual database (DB) 302 for subsequent retrieval.

The importer module 204 may include a speaker diarization module 344 that receives media 322 and transcribed text from text transcriber 342. The speaker diarization module 344 may analyze the received data to identify different speakers in the video or audio media, and match the transcribed text to each speaker. In some embodiments, speaker diarization can be done as a two-stage pipeline: (1) use Mel Frequency cepstral coefficients (MFCC's) to extract features; and (2) apply a Gaussian Mixture Model (GMM) to model each speaker, and then Hidden Markov Models (HMM) can be used for clustering. In some embodiments, the resulting dialogue may be stored in a suitable subtitle format such as SubRip text, for example.

The importer module 204 may include text processor 346 to process text. For example, the text may come from text-based media 324, or the text may come from speaker diarization module 344. In some embodiments, the importer module 204 may convert all multimedia content into text content. The text processor 346 may store the received text (e.g., in textual DB 302), along with any associated metadata such as author, creation date, publisher, etc.

In some embodiments, the analyzer module 206 may analyze the text to generate an overall summary for each of the media. The analyzer module 206 may employ text analytics algorithms to "essence tag" the original media 322, 324 (e.g., video stream, audio recording, text document, etc.) to identify media segments that may be potentially relevant based on various criteria. In some embodiments, tagging may use simple tokens and n-gram tokens to identify any potentially relevant media segments of media 322, 324 in order to facilitate playback of the identified media segments. A media segment, for example, may be an n-second segment of a video recording, and may or may not include the audio portion. A media segment may be an n-second segment of an audio recording. If the media is an electronic document, then a media segment may be a few sentences or paragraphs taken from a textual document, or a slide or two comprising a slide presentation, and so on.

The retriever module 208 may include a user interface (UI) that the user can interact with to access and consume multimedia content. The back end of the retriever module 208 may interface with textual DB 302 and media DB 304 to provide search and retrieval capabilities in accordance with the present disclosure. This aspect of the present disclosure will be described in more detail below.

Figure 4:
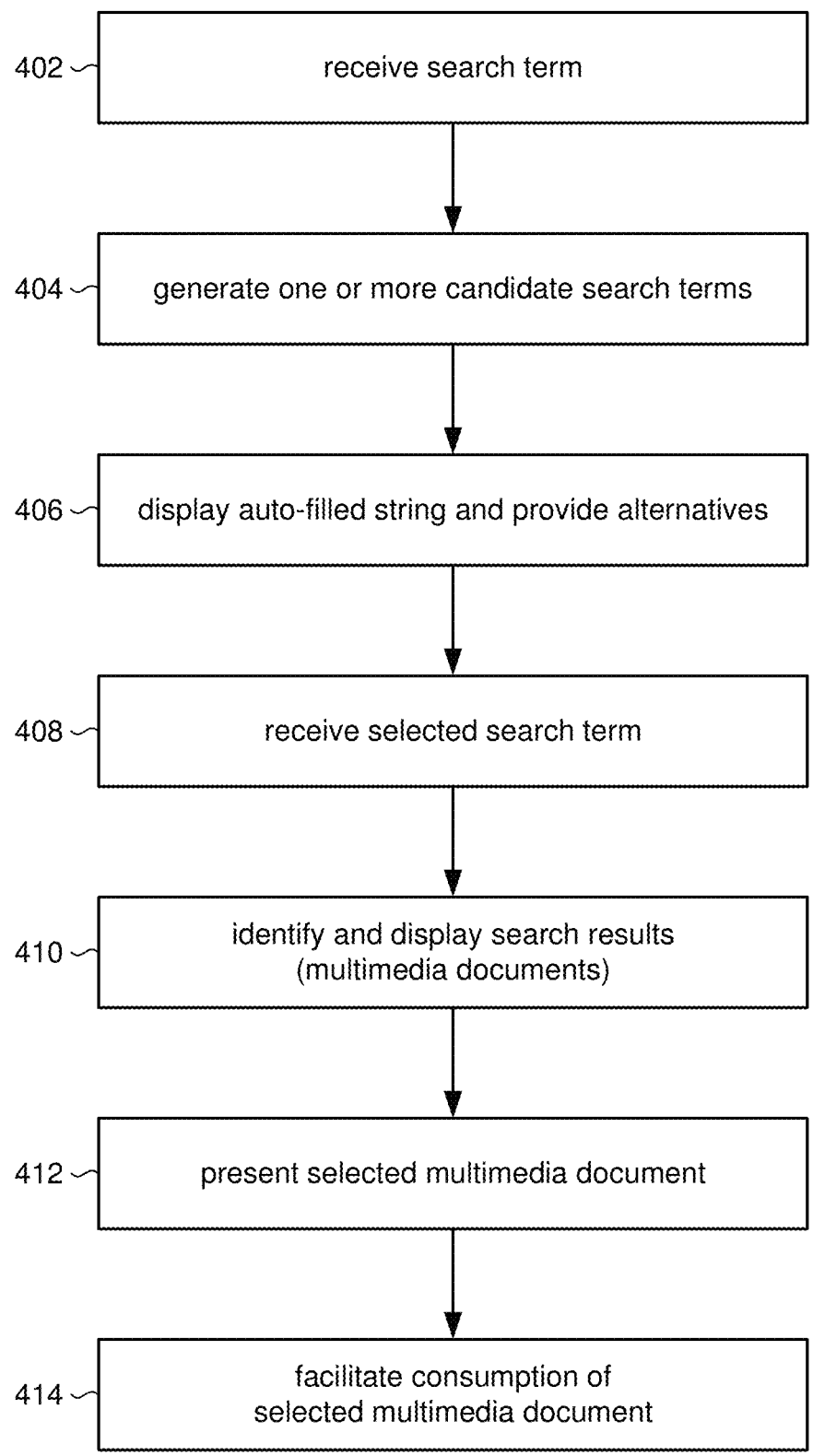
FIG. 4 illustrates a process flow in accordance with some embodiments of the present disclosure.

FIG. 4 illustrates some processing by a UI component of the retriever 208 in accordance with embodiments of the present disclosure. At block 402, the retriever 208 may receive a search term from the user. For example, the retriever 208 may present a UI on a display device that the user can interact with. It is noted that "search term" can refer to a query that comprises a single term, in some instances, and can refer to a query that comprises several terms in other instances.

Figure 8A:
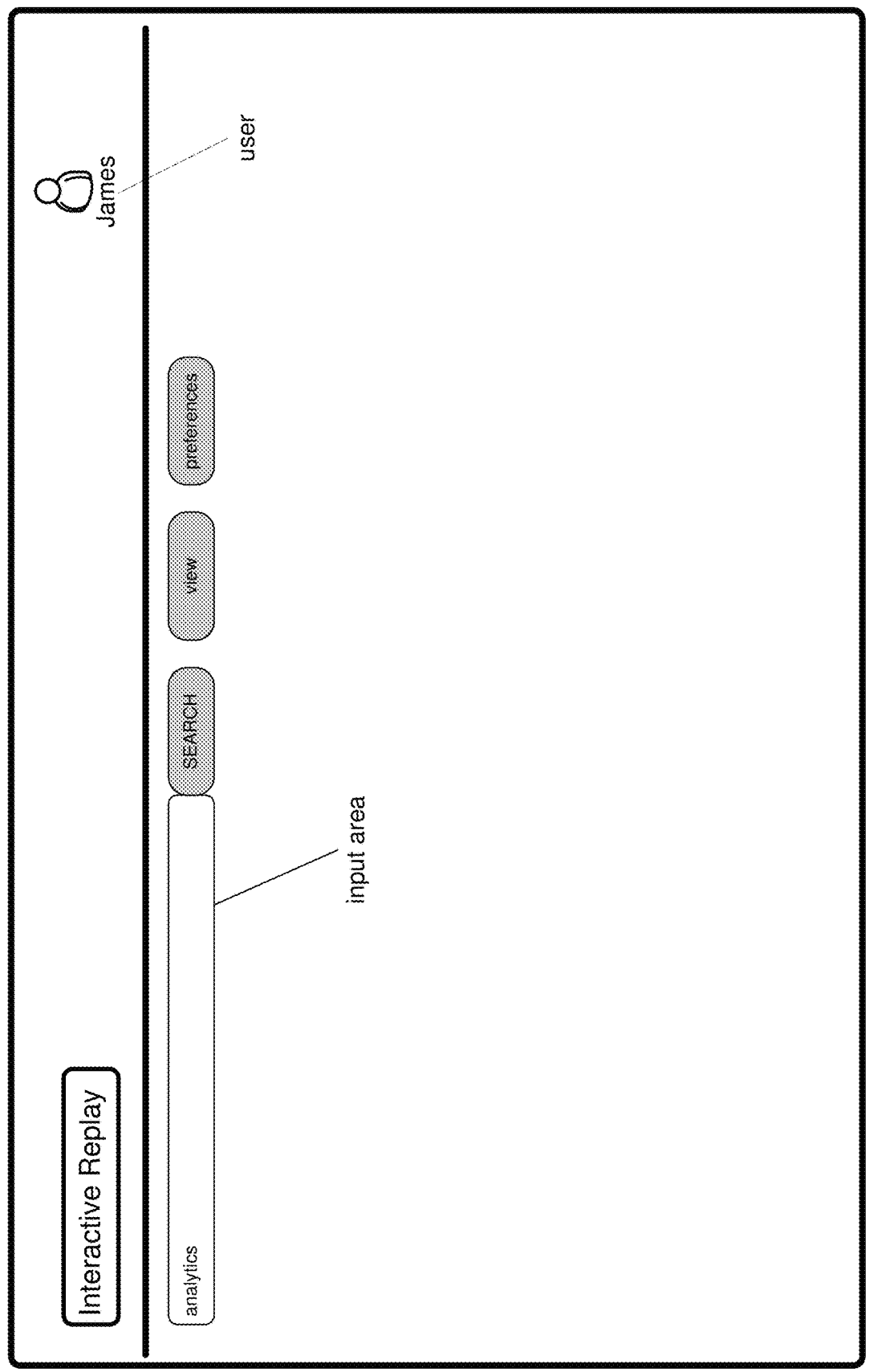
FIGS. 8A, 8B, and 8C illustrate an example of a home/search page in a user interface in accordance with some embodiments of the present disclosure.
Figure 8B:
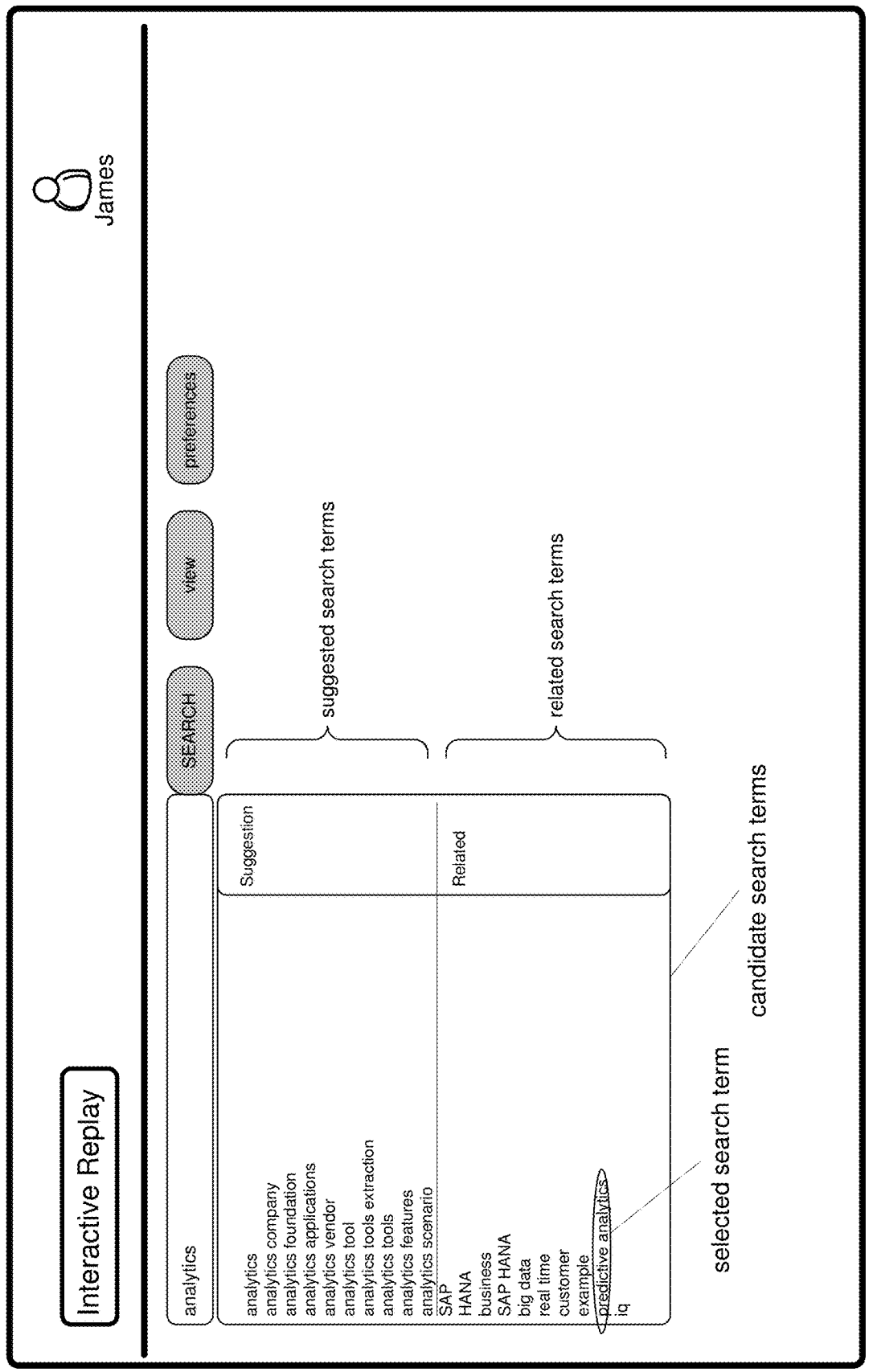

As the user starts typing their search term, the retriever 208 may respond to the partial search term that is being entered. Accordingly, at block 404 the retriever 208 may generate several candidate search terms based on the partial search term to assist the user in drilling down their initial search results. The candidate search terms may be generated based on related co-occurring terms with the partial search term, synonyms, and the like. In some embodiments, different types of candidate search terms may be generated. One class of candidate search terms may be 'suggested' search terms that contain at least a part of the user's search term. Another class of candidate search terms may be 'related' search terms that relate to the user's search term. See, for example, FIG. 8B showing how suggested and related search terms may be presented to a user in some embodiments.

Continuing with FIG. 4, at block 406, the retriever 208 may provide auto-completion functionality to help the user search effectively. In some embodiments, for example, the retriever 208 may support auto-completion functionality to give the user alternative search terms to choose from (e.g., FIG. 8B). To further assist the user in drilling down their initial search results, the retriever 208 may suggest a list of closely related co-occurring terms in the search term, which may help the user to obtain better-focused results. The retriever 208 may also point out synonyms for search terms that also occur in the search library.

In accordance with the present disclosure, the retriever 208 may use the user's context to generate candidate search terms. For example, the retriever 208 may take into account user interests (e.g., preferences) that the user may register with the system. In some embodiments, the UI may track the user's viewing history to build up a profile of the user's context. For example, the UI may track the history of the user's selection of topics during search session. This information can serve as an indication of what the user's preferences are in terms of relevant subject mater. The retriever 208 may be able to use such context information to determine candidate search terms.

In accordance with the present disclosure, the retriever 208 may access the user context of others as criteria for generating candidate search terms. In some embodiments, for example, the user context of persons who are similar to the user may be used. In this context, "similar" may refer to characteristics that the user and others may have in common. For example, the role of a person in an enterprise (e.g., manager, sales person, engineer, IT support, etc.) may be a characteristic that used to identify "similar" persons. Another characteristic among similar persons may be that they are in the same group in the enterprise (e.g., sales team, engineering team for a particular produce, they are all managers, etc.). Accordingly, in some embodiments, the retriever 208 may identify persons who are similar to the user and use their user contexts to determine candidate search terms.

Continuing with the description of FIG. 4, at block 408, the retriever 208 may receive a selected search term from the user. For example, the search term may come from the input field, or may be selected from among the candidate search terms displayed to the user.

At block 410, using the selected search term, the retriever 208 may access the DBs 302, 304 (FIG. 3) to search for or otherwise identify one or more search results. In some embodiments, the retriever 208 may search across all formats of multimedia content; e.g., video, audio, text, images, etc. Furthermore, for certain media types such as audio or video, the search may not be limited to just the metadata associated with the multimedia content. In some embodiments, the retriever 208 may search through the textual transcripts of such media. This can ensure that the quality of the search results returned reflects the most relevant multimedia content, irrespective of their format.

In some embodiments, each search result may be assigned a score that indicates its relevance to the search term. For example, the score may be calculated on factors such as text ranking based on the term frequency-inverse document frequency (TF-IDF) score. The TF-IDF score is a metric, known by persons of ordinary skill, that reflects the importance of a term in particular text amongst a collection of text documents. In some embodiments, other search aids and search related features may be implemented, for example:

Synonyms: A list of synonyms may be maintained in the textual DB 302. This list may then be searched against for identified tokens in the search term.

Auto-complete suggestions: These may be fetched by searching for the top ten tokens which begin with the entered search text.

Related: Related keywords may be defined as those tokens that highly co-occur with the search term. The algorithm can select the top ten tokens by count in the 50 most relevant search results for the search term.

Snippets: A snippet functionality may be used to highlight the search term (e.g., using bold characters) in an excerpt of text from the search result.

In some embodiments, the retriever 208 may use the user's context (described above) in conjunction with the selected search term to identify one or more search results. For example, the user's context may include a history of the user's selection of topics in prior search sessions. Such information can be used as an indication of the user's preferences in terms of relevant subject mater, which the retriever 208 may be able to use to generate the one or more search results. In some embodiments, the user context of other persons may be used to identify the one or more search results. For example, the retriever 208 may identify persons who are similar to the user and use the user contexts of those persons as a basis for identifying the search results.

The user context may include information other than information based on the user's preferences and habits for consuming multimedia content. For example, information contained in the user's calendar may be used as a basis for identifying search results. In some embodiments, for example, the retriever 208 may connect to or otherwise access the user's calendar and identify relevant search results. Suppose, for example, the user is about to enter a customer meeting. Before the customer meeting, the retriever 208 can recommend past meetings with the same customer, allowing the user to quickly preview those past meetings to refresh what had been discussed.

User context information may include the user's current location (e.g., using GPS information obtained from the user's mobile device, or from sensors located in the user's environment, etc.), time of day, and so on, which may be useful to identify relevant search results. User context information may include the user's calendar, revealing meetings, trips and other activities that may be used to identify relevant search results. As noted above, in some embodiments, the user context information of others may be used to identify relevant search results; e.g., others who are in some way similar to the user.

Continuing with the description of block 410, the retriever 208 may display the identified search results on a display device. In accordance with the present disclosure, the retriever 208 may associate each search result with a text snippet. In some embodiments, for example, a text snippet may comprise portions of the search result that contain an occurrence of the selected search term. This can help to give the user a sense of where the search term occurs in the search result, and in roughly which context.

At block 412, the retriever 208 may present a selected search result to the user in an area of the display. In some embodiments, presentation of the selected search result may include a targeted summary (auto summarization) of the selected search result. Auto summarization can be very useful in cases of long video recordings or long audio recordings, giving the user relevant information in order to decide whether they want to watch the entire content. For example, the retriever 208 may generate on the fly, a preview (summary) comprising a shortened and concise version of the content comprising the selected search result. The preview may comprise relevant segments of the content so that the user can, in a short time, get to know the gist of the content. In some embodiments, the summarization may comprise the most viewed (watched or listened or read) segments of the selected search result. For example, segments of multimedia content may be tracked with metadata representative of the respective number of views of the segments. The retriever 208 may use that metadata to preview, for example, the top five segments of the selected search result. Though previews are well suited for video and audio content, previews may also be used to preview sections of electronic documents; e.g., relevant pages in the document, or relevant slides, and so on.

The section or sections of the selected search result that are previewed may be identified based on keywords in a tag cloud (described below) associated with the selected search result. For example, sentences that occur in a timeframe of five seconds before and after those keywords may be included in the preview. In some embodiments, the user's user profile may be taken into consideration to enable more focus on certain topics in the preview.

In some embodiments, the preview may be based on the user's user context, and in other embodiments, the user context of other users may be used to generate the targeted summary. This can enable the user to have a quick preview of the content of the selected search result that is relevant specifically to that user, taking into the account the user's context, and in some cases the context of other users.

Consider, for example, a company's conference keynote video introducing new software products. The retriever 208 may generate a preview of the keynote video that highlights customer features in the new software products for a user who is a sales representative. On the other hand, a user who is a development engineer may be presented with those portions of the keynote video that focus on developer tools or more technical aspects of the new software products.

In some embodiments, the retriever 208 may use the user's viewing patterns to create a preview. For a given multimedia content, the viewing patterns of users can tell a lot about which parts of the search result are more interesting and is keeping them interested and engaged, and which parts of the search result do users usually skip perhaps because they are not interesting or do not cover significantly important areas related to the topic. Also, a user viewing the initial part of the content and then skipping it entirely also gives valuable feedback about viewing patterns based on user context. The UI, for example, may track how the user consumes multimedia content over time. For example, the user might typically skip through the introductions and navigate straight to the sections where the demo is being performed. The user might shuttle back and forth in the video multiple times on certain snippets in the video to completely grasp or reconfirm what is being presented.

The user's viewing patterns for electronic documents may likewise be captured and monitored. For example, the viewing pattern may include metrics on how much time the user spends on a page before scrolling to the next page. Although perhaps not as important as with video or audio content, the retriever 208 may nonetheless use a user's viewing patterns of electronic documents to control how electronic documents are presented to the user.

In some embodiments, presentation of the selected search result may include a tag cloud which can give the user a good idea of the content. In accordance with embodiments of the present disclosure, a "tag cloud" may comprise the main topics that the multimedia content describes. The tag cloud may include terms and phrases that appear with some frequency in the content. For example, where the multimedia content is a video recording or an audio recording, a textual transcript of the audio portions of the media may be produced. Analysis of the transcript may reveal concepts, ideas, and the like contained in the content. Likewise, for multimedia content that are electronic documents such as PDF files, text documents, presentation slides, and so on. Having a quick look at the tag cloud and the prominent terms highlighted by it can give the user a good idea of the relevance of the multimedia content. In some embodiments, for example, the tag cloud may comprise the top ten tokens from a list of tokens associated with the selected search result. The count for each of these tokens may be used to determine how the token is represented in the tag cloud.

In some embodiments, presentation of the selected search result may include user comments. Other consumers of a given multimedia content may post comments such as their thoughts, ideas, etc. relating to the subject matter of the content. Comments may include links to other multimedia content. Such comments may be a good indicator of the quality of the content in the selected search result. Accordingly, in some embodiments, the retriever 208 may access and assess the comments in order to provide the user with a quick gist of the tone of comments. For example, the retriever 208 may perform sentiment analysis (described in more detail below) on the comments and present a visual indicator (sentiment metric) that represents whether the comments are mostly positive or negative, and how strong are the views that are expressed in the comments. See, for example, FIG. 9A, where in some embodiments, the sentiment metric may be represented using a speedometer graphic.

Continuing with FIG. 4, at block 414, the retriever 208 may facilitate the user's consumption (viewing, listening, reading, etc.) of the selected search result in order to increase the usefulness of the information presented to the user. In some embodiments, for example, the retriever 208 may present user tags to help the user navigate to parts of the selected search result. In some embodiments, users who consume multimedia content may be able to tag certain portions of the multimedia content with additional metadata ("user tags") such as comments or tips that they feel would be useful for fellow users to know. For audio or video content, for example, users may tag the video by selecting a certain portion of the timeline and entering in tag text in a popup that appears. This crowd sourced information using tags can be quite helpful in various situations where the user is looking for a specific matter in the selected search result, and can quickly find it if others had already tagged it while previously searching for it in the same or similar context. Similarly, user tags can also help avoid certain sections if those sections are tagged as unhelpful. User tags also can be useful in combination with the speaker diarization performed by the importer module 204, as it would enable the user to quickly jump to a section where a particular speaker is talking.

In some embodiments, the retriever 208 may present cue points to guide the user through the selected search result. For example, keywords appearing in a tag cloud associated with the selected search result may serve as cue points. The user may click on one of these tags to see the occurrence of those keywords in the selected search results. In the case of video, for example, such keywords may be displayed in the form of cue points on a video player timeline. This can help the user to quickly see what the content says about that particular topic. See, for example, FIG. 10.

In some embodiments, the retriever 208 may suggest other multimedia content that are related to the main topics that the selected search result talks about. This can be very helpful especially for those users who have either liked the current media content or want to know more about the subject matter of the media content. They do not need to search again and can quickly navigate to related sources.

In some embodiments, for example, related media may be determined using a metric, known by persons of ordinary skill, called the "cosine similarity" measure. Cosine similarity is a measure of similarity between two vectors and can be calculated by measuring the cosine of the angle between the two vectors. Cosine similarity can be applied to determine relatedness between content by considering each instance of multimedia content as a media vector. For example, the components of this media vector may be the tokens, where the vector magnitude is based on the count of that token in the corresponding multimedia content. We then calculate the cosine of the angle between the media vector of the selected search result and the media vectors of other multimedia content. The closer the cosine similarity measure between two media instances is to 1, the higher is the similarity between the two. In this way, we can identify a list of multimedia content that are strongly related to the selected search result. In some embodiments, for example, the following SQL views and SQL queries may be used to find closely related media:

TABLE I

```
CREATE VIEW "MEDIA_TOKEN_COUNT" AS (
    SELECT MEDIA_ID, TA_TOKEN AS TOKEN, COUNT(1) AS COUNT
    FROM "$TA_IDX_TRANSCRIPT"
    GROUP BY MEDIA_ID, TA_TOKEN
);
CREATE VIEW "MEDIA_TOKEN_MOMENT" AS (
    SELECT stat."MEDIA_ID", stat."CNT" AS "NUM_TOKENS", stat."SUM" AS "TOTAL",
    SQRT(stat."SUM_SQUARES") AS "MAGNITUDE"
    FROM (
        SELECT COALESCE("MEDIA_ID", 0) AS "MEDIA_ID", COUNT(1) AS "CNT", SUM
        ("COUNT") AS "SUM", SUM ("COUNT" * "COUNT") AS "SUM_SQUARES"
        FROM "MEDIA_TOKEN_COUNT"
        GROUP BY "MEDIA_ID"
    ) AS stat
    ORDER BY MEDIA_ID
);
##Query for getting the related videos
SELECT md.ID, md.THUMBNAIL, md.TITLE, md.DURATION, sc.CORR
FROM
(
    SELECT TOP 5 ABX.MEDIA_ID, SCALAR_PRODUCT / (ABX.MAGNITUDE * Y.MAGNITUDE)
    AS CORR
    FROM
    (
        SELECT B.MEDIA_ID, SUM(A.COUNT* B.COUNT) as SCALAR_PRODUCT,
        X.MAGNITUDE
        FROM
        MEDIA_TOKEN_COUNT AS A
        JOIN
        MEDIA_TOKEN_COUNT AS B
        ON A.TOKEN = B.TOKEN
        AND A.MEDIA_ID = ?
        AND B.MEDIA_ID != A.MEDIA_ID
```

TABLE I-continued

```
    JOIN
    MEDIA_TOKEN_MOMENT AS X
    ON A.MEDIA_ID = X.MEDIA_ID
    GROUP BY B.MEDIA_ID, X.MAGNITUDE
  ) AS ABX
  JOIN
  MEDIA_TOKEN_MOMENT AS Y
  ON Y.MEDIA_ID = ABX.MEDIA_ID
  ORDER BY CORR DESC
) as sc
JOIN "MEDIA" AS md
ON md.ID = sc.MEDIA_ID
with hint (OLAP_PARALLEL_AGGREGATION);
```

In some embodiments, sections of multimedia content that are viewed by users may be recorded. The retriever 208 may use this information to identify commonly viewed sections of the selected multimedia content, and present or otherwise identify the commonly viewed sections to the user.

Figure 5:
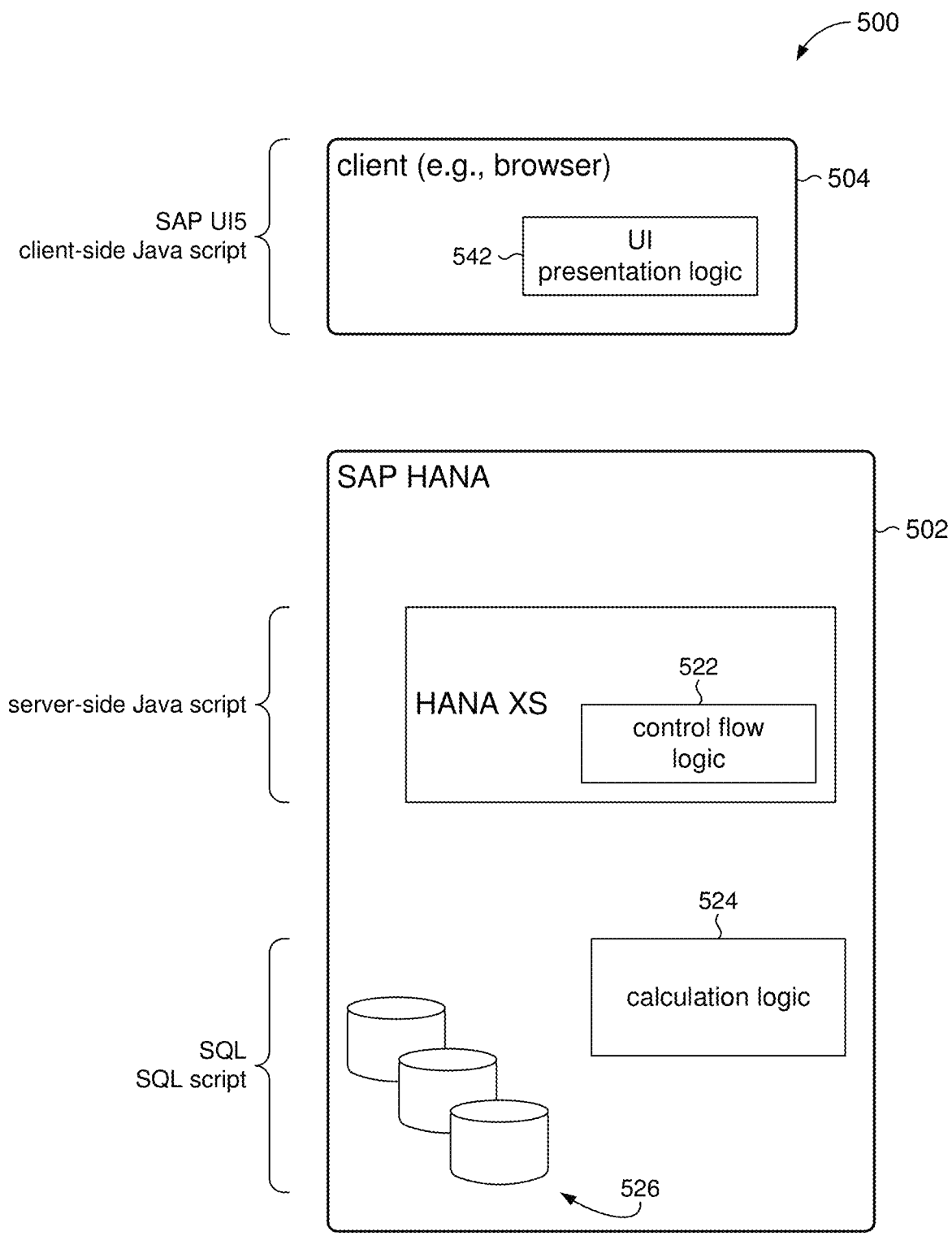
FIG. 5 illustrates a high level block diagram of an implementation architecture of an interactive replay system in accordance with some embodiments of the present disclosure.

Referring to FIG. 5, some implementation details of an interactive replay system 500 in accordance with some embodiments of the present disclosure will be discussed. In some embodiments, for example, a backend 502 may comprise a database system having analytics capability. A frontend 504 may be a web-based browser that can access services from the backend 502.

Merely as an example to illustrate a particular implementation, the backend 502 may be based on the SAP® HANA® in-memory database platform, which is a data platform capable of performing real-time analytics, and developing and deploying real-time applications. A web application server may be implemented with the HANA® database platform itself. For example, the SAP® HANA® Extended Application Services (HANA XS) engine may provide control flow logic 522 that implements the retriever 208 (FIGS. 2 and 3) as a web application.

The HANA® database platform may also support the analytics and other calculation logic 524 that implement the importer module 204 and the analyzer module 206. In our illustrative example, text analysis may be done using HANA's text analysis capabilities, which has some predefined configurations to identify keywords or tokens and their type. For example, the EXTRACTION_CORE configuration can identify single or n-word tokens and classify them in specific subclasses like organization, country, time, etc. The LINGANALYSIS_FULL configuration, on the other hand, focuses more on linguistic analysis, identifying tokens and classifying based on part of speech and also identifying its stem word. Analysis can be done using both these modes to create a full text index.

There may be noise present in the quality of keywords extracted out because of the sheer volume of data. Thus, filtering out some of them may be useful. Tokens of certain types may be removed which will not be useful along with certain stop words. For example, all the remaining EXTRACTION_CORE mode tokens may be taken in while the top 5 tokens from LINGANALYSIS_FULL mode, which also occur as a part of non top-10 n-gram tokens, may taken in. They may then be further normalized to their stem or singular form. Results from the analysis may be stored in textual DB 302 and media DB 304, which in a particular implementation may be supported by the HANA® database platform.

In our illustrative example, HANA's text analysis capabilities may be used to perform sentiment analysis to mine user comments, described above, associated with a selected search result. For example, sentiment analysis may be carried out on the user comments using the EXTRACTION_CORE_VOICEOFCUSTOMER configuration mode of HANA's text analysis. Under the hood, this configuration can perform complex linguistic analysis and pattern matching to identify positive and negative sentiments and also classify the intensity of these sentiments. The tokens may be excerpts of text from the user comments and their classification. Recognized classes may include: Strong Positive Sentiment; Weak Negative Sentiment; Positive Emoticon; Major Problem; and so on. A heuristic algorithm may process the result of this analysis and formulate the net resultant sentiment of all the comments on a 5-point scale. The heuristic algorithm, for example, may involve the following steps:

Assign a score for each classification type of token recognized by the text analysis mode.

There can be multiple classes detected for different parts of the same comment. So we find the net score for a given comment.

Find the net average score for a given comment; e.g., SUM SCORE/#SENTIMENTS.

Find the average rating from all the comments on the selected media; e.g., SUM AVG/#COMMENTS.

Classify into five sentiment-rating levels based on the net average.

In a particular implementation, for example, the algorithm may be implemented as an SQL query, as shown for example in TABLE II below:

TABLE II

```
SELECT MEDIA_I,
(CASE WHEN AVG_RATING >1.5 AND AVG_RATING <= 2 THEN 2
  WHEN AVG_RATING > 0.25 AND AVG_RATING <= 1.5 THEN 1
  WHEN AVG_RATING > -0.25 AND AVG_RATING <= 0.25 THEN 0
  WHEN AVG_RATING > -1.5 AND AVG_RATING <= -0.25 THEN -1
  WHEN AVG_RATING >= -2 AND AVG_RATING <= -1.5 THEN -2
  ELSE 0
END) AS SENTIMENT_RATING
```

TABLE II-continued

```
FROM (
SELECT MEDIA_ID, SUM_COMMENT_AVG / NUM_COMMENTS_MEDIA AS AVG_RATING FROM (
    SELECT MEDIA_ID, SUM(AVG_COMMENT_RATING) AS SUM_COMMENT_AVG, COUNT(*) AS
    NUM_COMMENTS_MEDIA FROM (
      SELECT MEDIA_ID, ID, SUM_SCORE/NUM_SENTIMENTS AS AVG_COMMENT_RATING
      FROM (
        SELECT MEDIA_ID, ID ,SUM(SCORE) AS SUM_SCORE, COUNT(*) AS
        NUM_SENTIMENTS FROM (
        SELECT MEDIA_ID, ID, TA_TYPE,
          MAP(TA_TYPE, 'StrongPositiveSentiment', 2, 'WeakPositiveSentiment', 1,
          'StrongPositiveEmoticon', 0.25, 'WeakPositiveEmoticon', 0.25,
          'NeutralSentiment', 0, 'NeutralEmoticon', 0, 'WeakNegativeEmoticon', -0.25,
          'StrongNegativeEmoticon', -0.5, 'AMBIGUOUS_PROFANITY', -0.5,
          'UNAMBIGUOUS_PROFANITY', -0.75, 'MinorProblem', -1,
          'WeakNegativeSentiment', -1, 'MajorProblem', -2, 'Strong NegativeSentiment',
          -2, 0)
        AS SCORE
        FROM "$TA_COMMENT SENTIMENT"
          WHERE TA_TYPE IN ('WeakPositiveSentiment', 'WeakPositiveEmoticon',
          'StrongPositiveEmoticon', 'NeutralSentiment', 'AMBIGUOUS_PROFANITY',
          'StrongPositiveSentiment', 'MinorProblem', 'WeakNegativeSentiment',
          'Strong NegativeSentiment', 'MajorProblem', 'WeakNegativeEmoticon',
          'UNAMBIGUOUS_PROFANITY', 'StrongNegativeEmoticon', 'NeutralEmoticon')
        )
        GROUP BY MEDIA_ID, ID
      )
    ) GROUP BY MEDIA_ID
) ORDER BY AVG_RATING
)
```

In our illustrative example, the UI presentation logic 542 running on the frontend 504 may allow the user to access the retriever 208 functionality provided by the web application running on the HANA XS® engine. The UI presentation logic 542 may implement a web browser comprise two main page designs: a home/search page (which can serve as the user's default home page) and a media display and summary page, which will be explained in more detail in FIG. 6.

Figure 6:
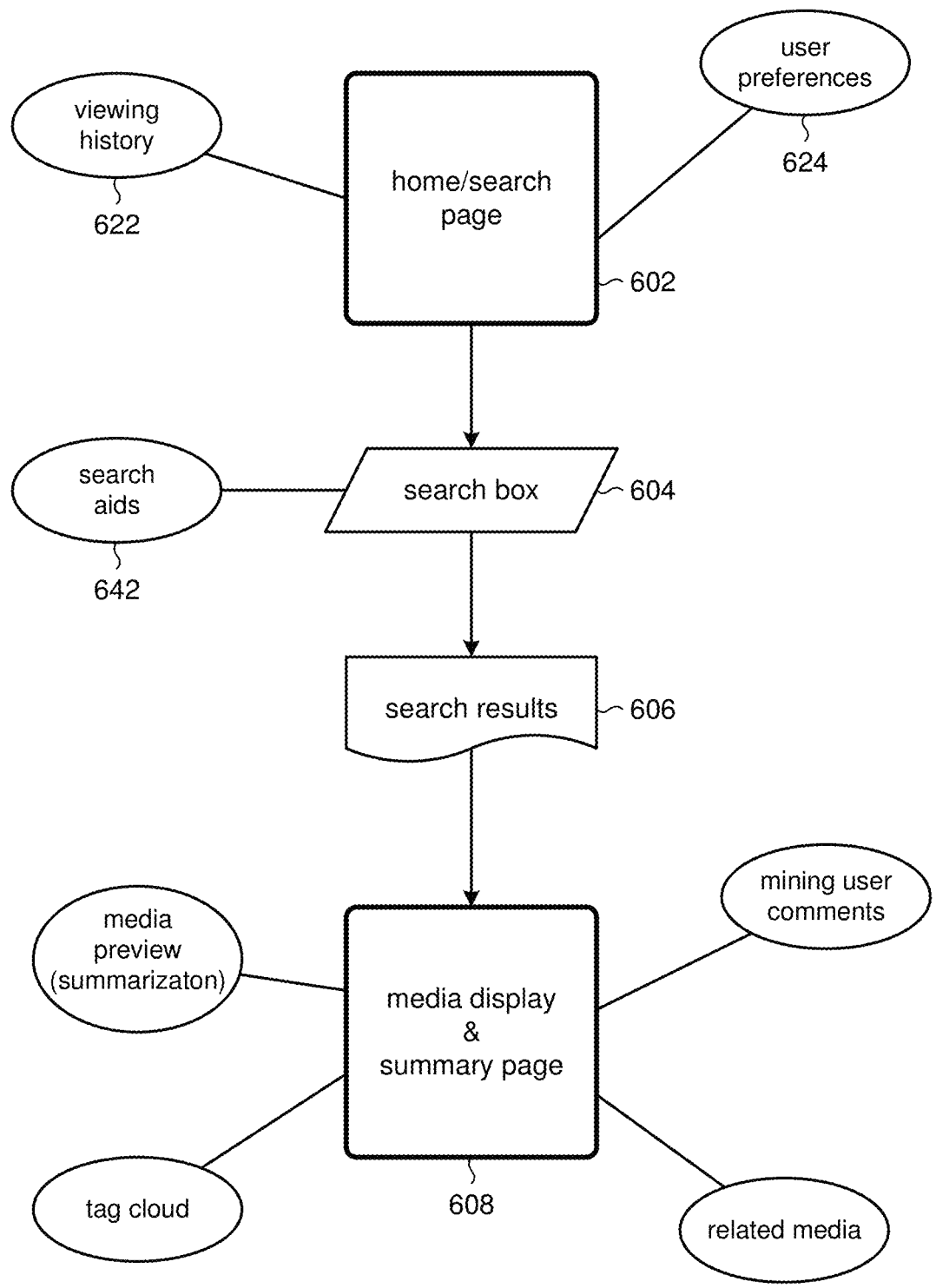
FIG. 6 illustrates a user interface flow of an interactive replay system in accordance with some embodiments of the present disclosure.

FIG. 6 illustrates an example, in accordance with some embodiments, of an interface flow when a user accesses the web application. For example, on accessing the web application, the home page 602 may be displayed which recommends to the user a list of media options to view, based on user interests and profile. The user can also access their viewing history 622 or view/edit their preferences/interests 624.

The search box 604 allows the user to enter their search request. The foregoing described search aids 642 such as context-based auto-complete can complete the search term as the user types in their request. The search aids 642 may display candidate search terms in a menu as the user starts typing; see for example, FIG. 8B.

The search results 606 may be displayed with text snippets. On selecting one of the search results, the UI may navigate to the media display and summary page 608. All the media summarization features and consumption suggestions may be a part of a media player or may be displayed somewhere on the media display and summary page 608.

Figure 7:
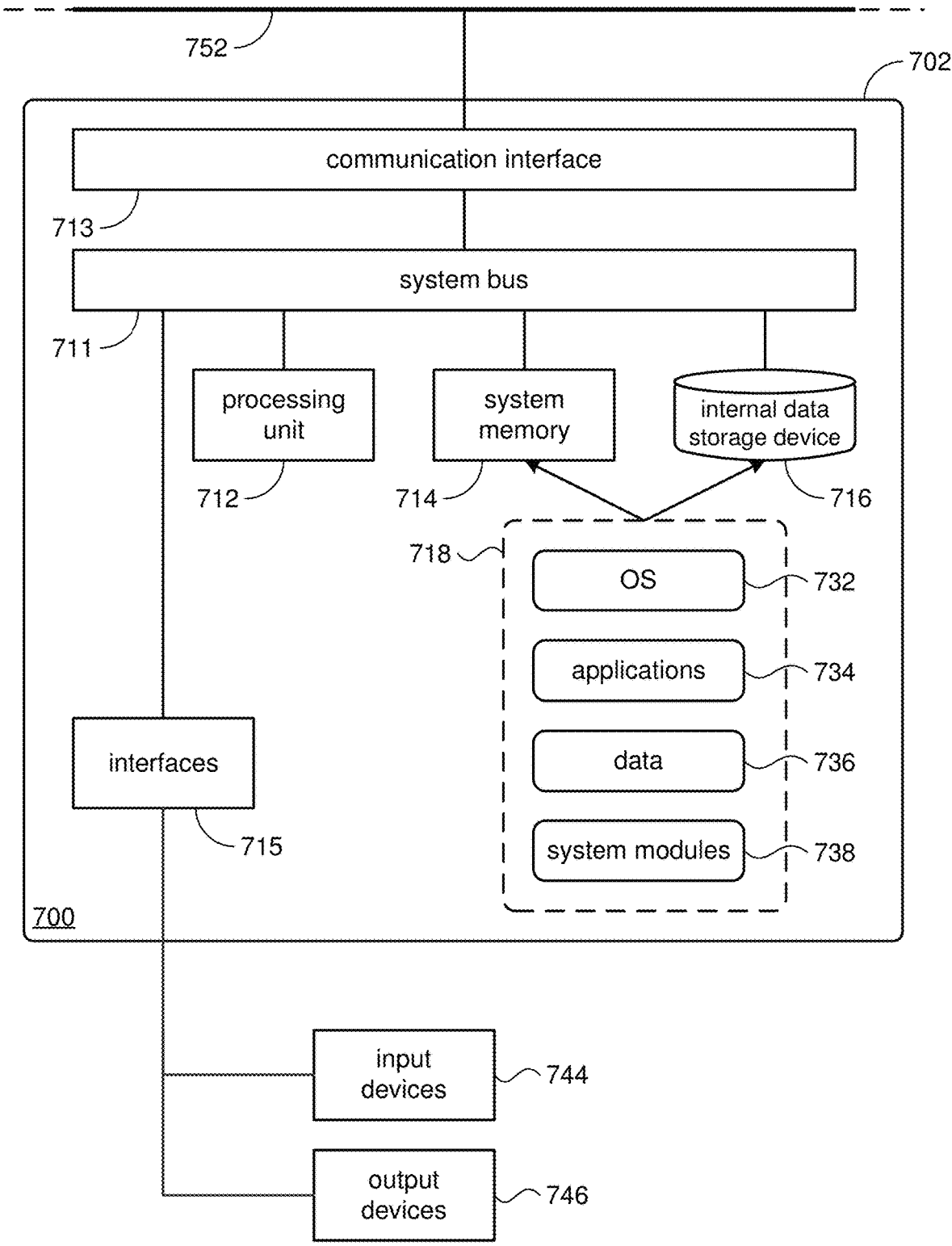
FIG. 7 shows a high level block diagram of a computer system in accordance with some embodiments of the present disclosure.

Referring to FIG. 7, an illustrative implementation of the interactive replay system 700 in accordance with some embodiments of the present disclosure may include a computer system 702 having a processing unit 712, a system memory 714, and a system bus 711. The system bus 711 may connect various system components including, but not limited to, the processing unit 712, the system memory 714, an internal data storage device 716, and a communication interface 713. In a configuration where the computer system 702 is a mobile device (e.g., smartphone, computer tablet), the internal data storage device 716 may or may not be included.

The processing unit 712 may comprise a single-processor configuration, or may be a multi-processor architecture. The system memory 714 may include read-only memory (ROM) and random access memory (RAM). The internal data storage device 716 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on). In a configuration where the computer system 702 is a mobile device, the internal data storage 716 may be a flash drive.

The internal data storage device 716 and its associated non-transitory computer-readable storage media provide nonvolatile storage of data, data structures, computer-executable instructions, and so forth. Although the description of computer-readable media above refers to a HDD, a removable magnetic diskette, and a removable optical media such as a CD or DVD, it is noted that other types of media which are readable by a computer, such as zip drives, magnetic cassettes, flash memory cards, cartridges, and the like, may also be used, and further, that any such media may contain computer-executable instructions for performing the methods disclosed herein.

The system memory 714 and/or the internal data storage device 716 may store a number of program modules, including an operating system 732, one or more application programs 734, program data 736, and other program/system modules 738. For example, in a computer system 702 configured as the SAP® HANA® in-memory database, the application programs 734, which when executed, may cause the computer system 702 to perform method steps of FIG. 4. The application programs 734 may constitute components of HANA XS which implement the importer module 204 and the analysis module 206.

Access to the computer system 702 may be provided by a suitable input device 744 (e.g., keyboard, mouse, touch pad, etc.) and a suitable output device 746, (e.g., display screen). In a configuration where the computer system 702 is a mobile device, input and output may be provided by a touch sensitive display.

The computer system 702 may operate in a networked environment using logical connections via wired and/or wireless communications to one or more remote computers (not shown) over a communication network 752. The communication network 752 may be a local area network (LAN) and/or larger networks, such as a wide area network (WAN).

The discussion will now turn to a description of some UI illustrations in accordance with embodiments of the present disclosure. FIG. 8A represents an example of a home/search page that the user may see when they log on. An input area may be provided to receive a search term. A VIEW button may allow the user to view their previously retrieved multimedia content. A PREFERENCE button may allow the user to set up various information about themselves, which can serve as user context information that the retriever 208 may use to auto-complete a search term, find and present search results, and determine how to present a selected search result.

FIG. 8A shows that the user has typed into the input area the search term "analytics". FIG. 8B demonstrates an example of auto-complete in accordance with the present disclosure. As the user is typing their search term, the retriever 208 may identify one or more candidate search terms. FIG. 8B shows that the list of candidate search terms may be grouped into 'suggested search terms' and 'related search terms.'

Figure 8C:
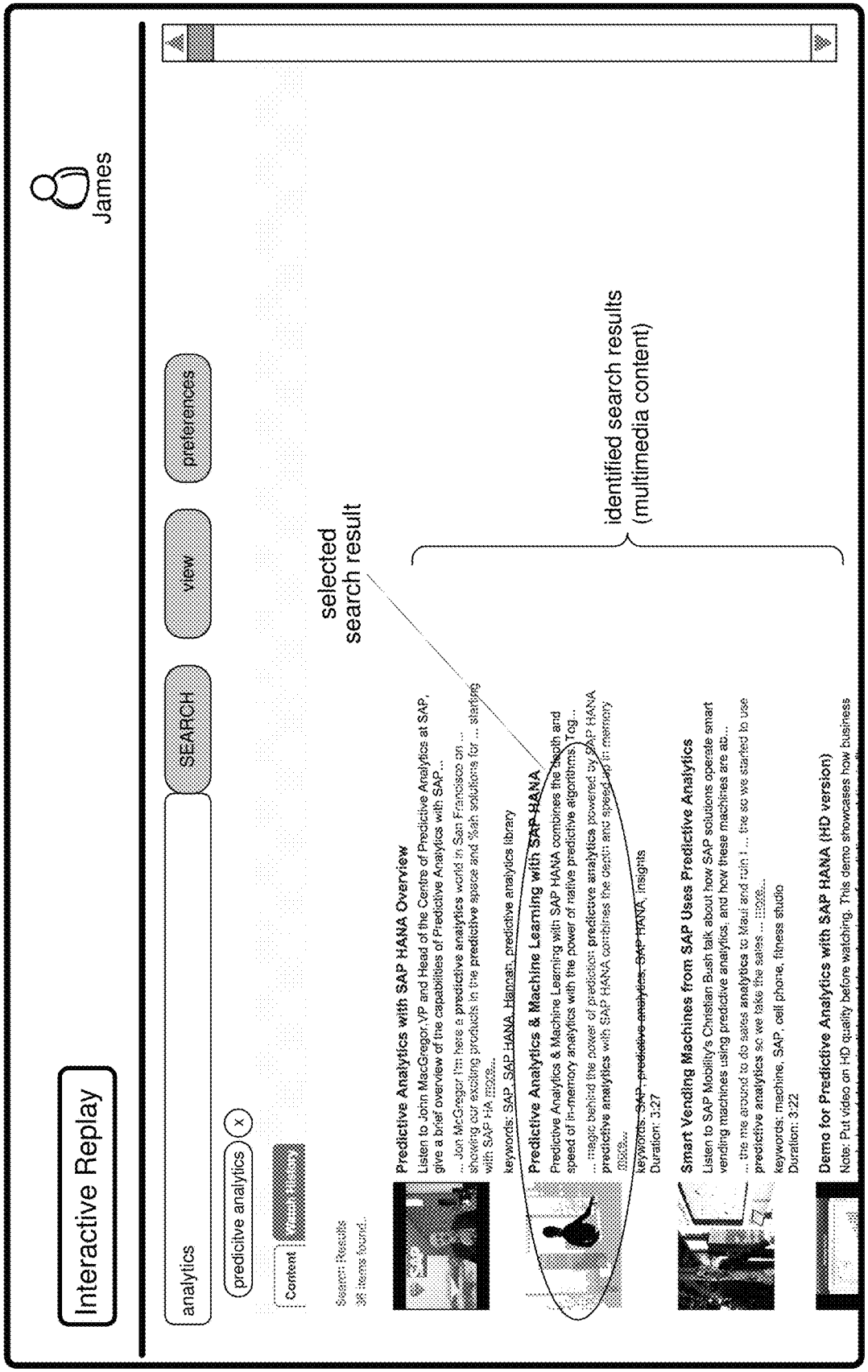

Suppose the user selects the search term "predictive analysis." FIG. 8C shows an example of the home/search page when the user selects and submits (e.g., clicks on the SEARCH button) a search term, showing an area in the home/search page where the search results can be displayed.

Figure 9:
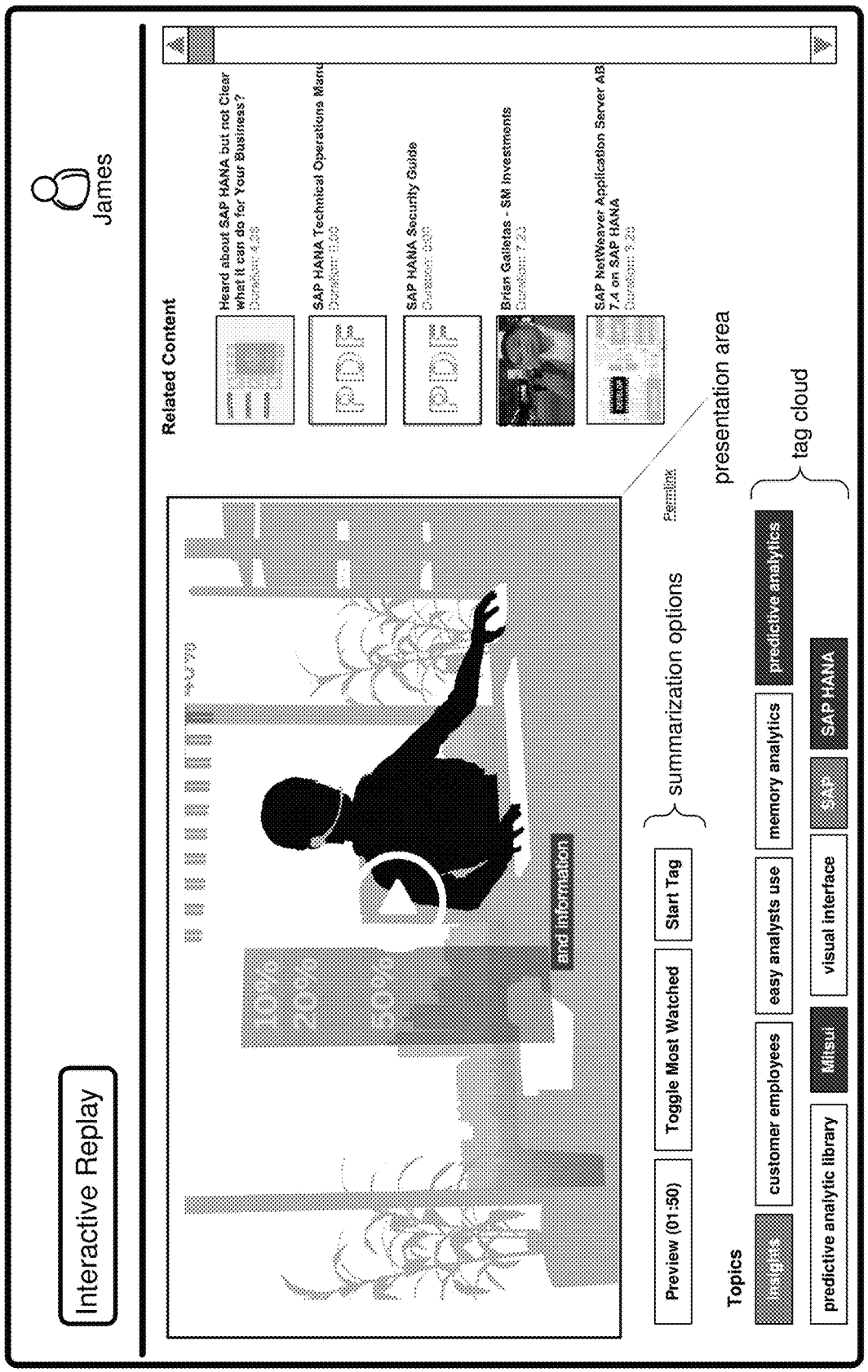

FIG. 9 represents an example of a media display and summary page. The media display and summary page may include a presentation area for presenting the selected search result. Summarization buttons may be provided to allow the user to view a preview of the selected search result, or toggle to the most watched portions of the selected search result. A tag cloud section may list relevant terms identified in the selected search result. In some embodiments, different shading may represent degree of relevance. Related content may be presented in the media display and summary page.

Figure 9A:
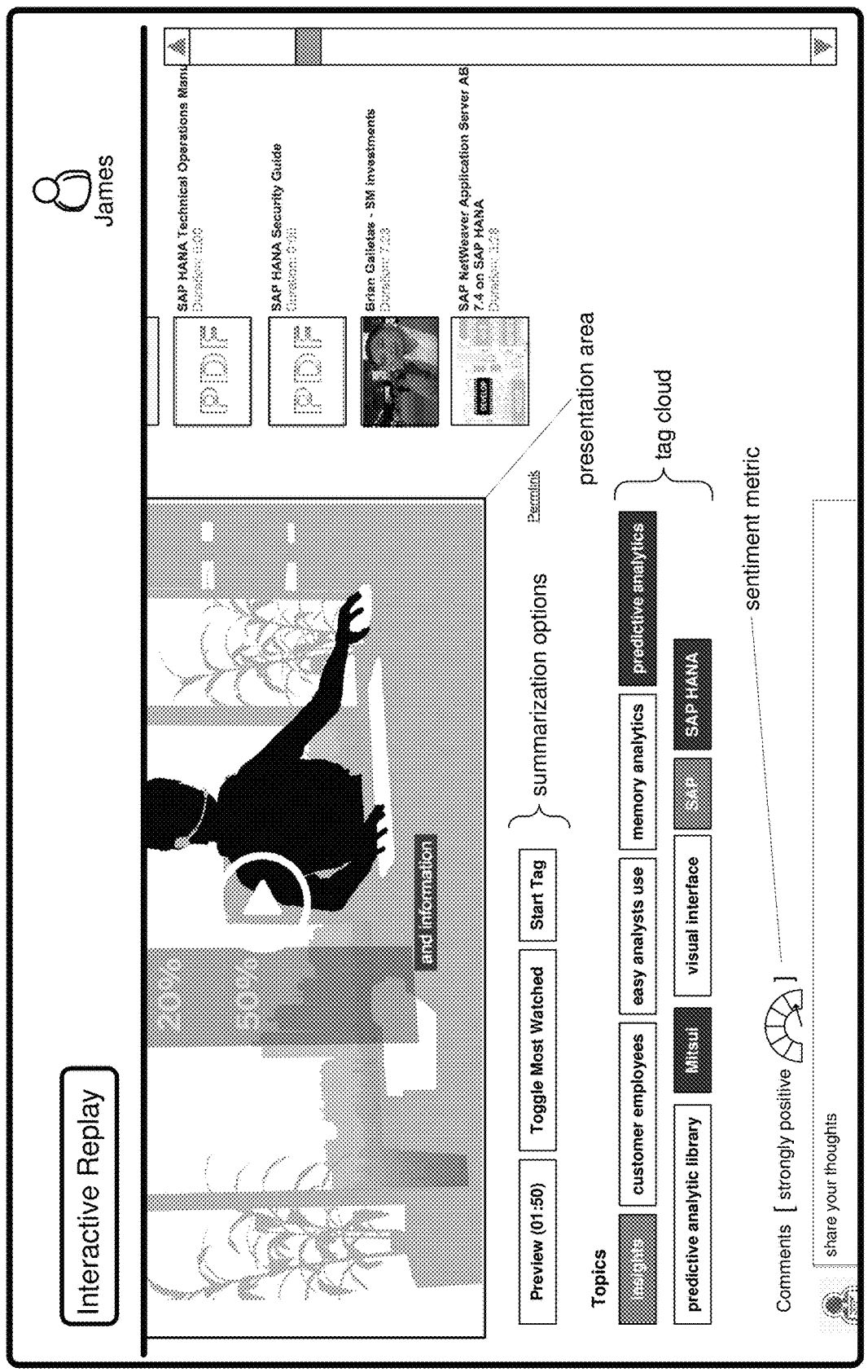

A sentiment metric may be displayed that provides a indication of others' opinions of the selected search result. FIG. 9A, for example, illustrates the UI shown in FIG. 9 having been scrolled up a bit to reveal an example of how the sentiment metric may be displayed. The sentiment metric may be expressed qualitatively (e.g., using terms such as negative, mediocre, positive, etc.), or more quantitatively (e.g., by the use of a speedometer graphic, actual values, etc.).

Figure 10:
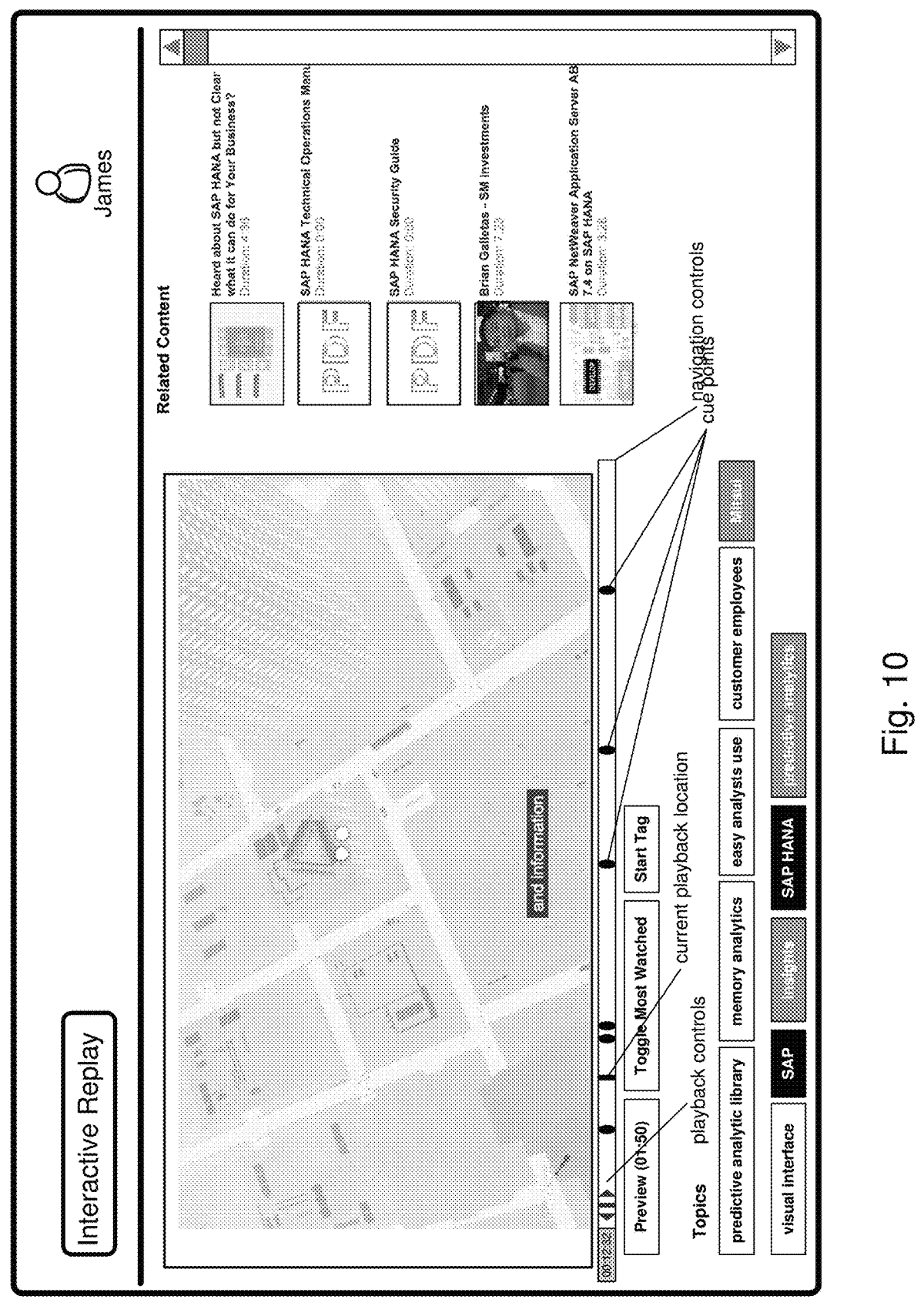

FIG. 10 represents an example of a media display and summary page presenting the selected search result with navigation controls to navigate the content. Playback controls may be provided. A current location indicator can show where in the timeline the content is being viewed. Cue points may be distributed on the timeline to highlight sections in the content that the retriever 208 deemed to be relevant, and indicate their relative temporal positions within the content. The user may click on a cue point to advance the content to the corresponding time.

What we claim are the following:

1. A method for retrieving stored multimedia content comprising:

receiving at least a partial search term entered by a user in an enterprise;

generating one or more candidate search terms from the partial search term using user-context data of other users in the enterprise who have roles in the enterprise similar to the user's role in the enterprise, the user-context data of other users including preferences, viewing history, and history of selection of topics during search sessions;

displaying on a display device the generated one or more candidate search terms;

receiving a candidate search term selected from among the generated one or more candidate search terms;

using the selected candidate search term and user-context data representative of a current context of the user to identify one or more search results from among the stored multimedia content, the user-context data of the user including data that is representative of the user's role in the enterprise and the user's current environment including the user's geographic location in the enterprise;

displaying on the display device a list of the one or more identified search results, which can then be presented to the user; and presenting to the user a search result selected from among the one or more identified search results.

2. The method of claim 1, further comprising using user-context data similar to contexts of other users to generate the one or more one or more search results.

3. The method of claim 1, further comprising using the user-context data similar to the current context of the user to generate the one or more candidate search terms from the partial search term.

4. The method of claim 1, further comprising using the candidate search term to identify a text snippet from each identified search result and displaying a plurality of text snippets with the one or more identified search results listed.

5. The method of claim 1, further comprising using the user's media consumption patterns to determine how to present to the user a selected search result.

6. The method of claim 1, further comprising presenting to the user a selected search result, including:

identifying portions of the selected search result using viewer-provided text comprising comments of users who have commented on the selected search result; and presenting the identified portions of the selected search result.

7. The method of claim 1, further comprising presenting to the user a selected search result, including:

presenting a tag cloud associated with the selected search result comprising one or more tags selected from textual tag data generated from an analysis of the selected search result; and presenting a portion of the selected search result corresponding to a tag in the tag cloud selected by the user.

8. The method of claim 1, further comprising presenting to the user a search result selected from the one or more identified search results and displaying a list of one or more related search results that relate to subject matter in the selected search result.

9. A method for retrieving stored multimedia content comprising:

receiving at least a partial search term of characters entered by a user in an enterprise;

generating a search term from the partial search term, including generating one or more candidate search terms from the partial search term using user-context data of other users in the enterprise who have roles in the enterprise similar to the user's role in the enterprise, the user-context data of other users including preferences, viewing history, and history of selection of topics during search sessions;

using the generated search term to identify one or more search results from among the stored multimedia content; and presenting to the user a search result selected from the one or more identified search results, including:

using user-context data associated with a current context of the user to generate summary information from the selected search result, the user-context data of the user including data that is representative of the user's role in the enterprise and the user's current environment including the user's geographic location in the enterprise; and presenting the summary information to the user.

10. The method of claim 9, further comprising identifying one or more segments of the selected search result to generate the summary information.

11. The method of claim 10 further comprising using the search term to identify the one or more segments of the selected search result.

12. The method of claim 10, further comprising using the user-context data similar to the current context of the user to identify the one or more segments of the selected search result.

13. The method of claim 10, wherein the one or more segments of the selected search result are the most viewed segments.

14. The method of claim 9, further comprising generating textual tag data from an analysis of the selected search result and generating a tag cloud associated with the selected search result comprising one or more tags selected from the textual tag data to generate the summary information.

15. The method of claim 14, further comprising using the search term to identify the one or more tags from the textual tag data of the selected search result.

16. The method of claim 14, further comprising using the user-context data similar to the current context of the user to identify the one or more tags from the textual tag data of the selected search result.

17. The method of claim 9, further comprising mining viewer-provided text, that is associated with the selected search result, comprising comments of users who have replayed and commented on the selected search result to generate the summary information.

18. The method of claim 17, further comprising using the search term to mine the viewer-provided text.

19. The method of claim 17, further comprising using the user-context data similar to the current context of the user to mine the viewer-provided text.

20. A system comprising:

a computer processor; and a data store having stored thereon computer-executable program code, which when executed by the computer processor, causes the computer processor to:

receive at least a partial search term entered by a user in an enterprise;

generate one or more candidate search terms from the partial search term using user-context data of other users in the enterprise who have roles in the enterprise similar to the user's role in the enterprise, the user-context data of other users including preferences, viewing history, and history of selection of topics during search sessions;

display on a display device the generated one or more candidate search terms;

receive a candidate search term selected from among the generated one or more candidate search terms;

use the selected candidate search term and user-context data representative of a current context of the user to identify one or more search results from among the stored multimedia content, the user-context data of the user including data that is representative of the user's role in the enterprise and the user's current environment including the user's geographic location in the enterprise;

display on the display device a list of the one or more identified search results, which can then be presented to the user; and present to the user a search result selected from among the one or more identified search results.

* * * * *